United States Patent [19]

Ogawa

[11] Patent Number: 4,760,462
[45] Date of Patent: Jul. 26, 1988

[54] HEAT SENSITIVE RECORDING SYSTEM IN FACSIMILE COMMUNICATION

[75] Inventor: Mutsuo Ogawa, Yokohama, Japan

[73] Assignee: Ricoh Company, Ltd., Japan

[21] Appl. No.: 797,751

[22] Filed: Nov. 12, 1985

Related U.S. Application Data

[63] Continuation of Ser. No. 361,873, Mar. 25, 1982, abandoned.

[30] Foreign Application Priority Data

Mar. 26, 1981 [JP] Japan .................................. 56-43176
Mar. 26, 1981 [JP] Japan .................................. 56-43177

[51] Int. Cl.$^4$ ............................................. H04N 1/21
[52] U.S. Cl. ................................... 358/280; 358/140; 346/76 PH
[58] Field of Search ............... 358/140, 260, 280, 287; 346/76 PH

[56] References Cited

U.S. PATENT DOCUMENTS

| | | | |
|---|---|---|---|
| 3,895,184 | 7/1975 | Komura et al. .................... | 358/260 |
| 4,054,914 | 10/1977 | Fukuoka .......................... | 358/287 |
| 4,158,861 | 6/1979 | Iizuka ............................. | 358/260 |
| 4,264,933 | 4/1981 | Kurahayashi et al. ............. | 358/260 |
| 4,368,491 | 1/1983 | Saito .............................. | 346/76 PH |
| 4,394,693 | 7/1983 | Shirley ........................... | 358/298 |
| 4,398,221 | 8/1983 | Yamaguchi ...................... | 358/280 |
| 4,415,907 | 11/1983 | Suemori .......................... | 346/76 PH |

FOREIGN PATENT DOCUMENTS

| | | | |
|---|---|---|---|
| 55-90383 | 7/1980 | Japan ............................. | 346/76 PH |
| 620029 | 8/1978 | U.S.S.R. ......................... | 358/260 |

Primary Examiner—Michael A. Masinick
Attorney, Agent, or Firm—Guy W. Shoup; Leighton K. Chong

[57] ABSTRACT

A heat-sensitive recording system for use in a facsimile communication network is provided. The present recording system is structured to use the same image information in multiple times under certain circumstances to keep the thermal recording head at a constant temperature. Accordingly, the image density of a recorded image is ensured to be uniform.

1 Claim, 4 Drawing Sheets

HEAT SENSITIVE RECORDING SYSTEM IN FACSIMILE COMMUNICATION

This is a continuation application from application Ser. No. 361,873, filed Mar. 25, 1982, now abandoned.

BACKGROUND OF THE INVENTION

1. Field of the Invention

This invention relates to a heat-sensitive recording system forming a part of a receiver in facsimile communication and more particularly to a temperature-compensated heat-sensitive recording system capable of maintaining the density of recorded images at a desired value irrespective of the characteristics of a transmitter.

2. Description of the Prior Art

In heat-sensitive recording systems, the temperature condition of a recording head is important because it affects the density of a recorded image. On the other hand, in facsimile communication, the recording speed at a receiver side is governed by the operating or transmission speed at a transmitter side. For this reason, in a facsimile communication network in which use is made of prior art heat-sensitive recording devices, a problem arises when the transmitter in communication is extremely slower in operating speed or has a lower resolution even if the operating speed is not so slow. That is, under such circumstances, the temperature of the recording head provided with an array of electrically resistive elements which is selectively heated to form a recording image on the surface of a thermo-sensitive paper tends to go down so that the overall image density of a recorded image is decreased, thereby hampering obtaining a clear recorded image excellent in quality.

SUMMARY OF THE INVENTION

The disadvantages of the prior art are overcome with the present invention and an improved heat-sensitive recording system for use in a facsimile communication network is provided.

In accordance with a main feature of the present invention, the number of scanning lines to which the same image information is to be applied is selectively determined depending upon the operating speed of the transmitter in order to maintain the temperature of the recording head at a desired value irrespective of the condition of the operating speed at the transmitter side.

The present invention provides a heat-sensitive recording system for use in a facsimile communication network for forming a visual image on the surface of a thermo-sensitive medium comprising: means for receiving image information transmitted through said network; means for temporary storing the image information supplied from said means for receiving; heat-sensitive recording means to which the image information is supplied from said means for temporary storing thereby forming a visual image on the surface of a thermosensitive medium; and means for controlling the supply of image information from said means for temporary storing to said heat-sensitive recording means such that the number of scanning lines to which the same image information is to be applied is selectively determined depending upon the operating speed and/or resolution of the transmitter which transmits said image information. Preferably, in the case where the transmitter is slower in transmitting image information, the same image information is supplied to the recording head of the recording means again for the next scanning line thereby preventing the temperature of the recording head from dropping below a predetermined value.

Accordingly, it is an object of the present invention to provide a heat-sensitive recording system capable of maintaining the image density unaltered even if the data transmission rate varies.

Another object of the present invention is to provide a heat-sensitive recording system which is not affected by the operating speed of the transmitter in communication.

A further object of the present invention is to provide a heat-sensitive recording system including a recording head which is always maintained at a predetermined temperature level when in use.

A still further object of the present invention is to provide a heat-sensitive recording system which is not affected by the data compression ratio in transmitting data through a facsimile communication network.

Other objects, advantages and novel features of the present invention will become apparent from the following detailed description of the invention when considered in conjunction with the accompanying drawings.

DESCRIPTION OF THE PREFERRED EMBODIMENTS

Figure 1:
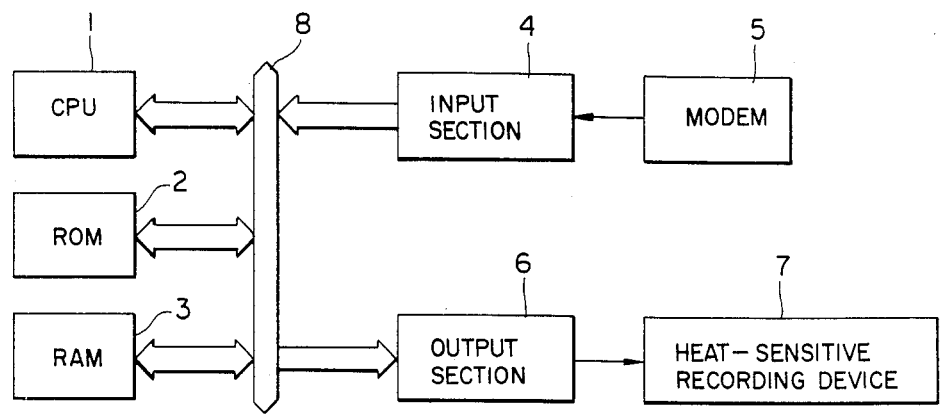
FIG. 1 is a block diagram showing one embodiment of the present invention.
Figure 2:
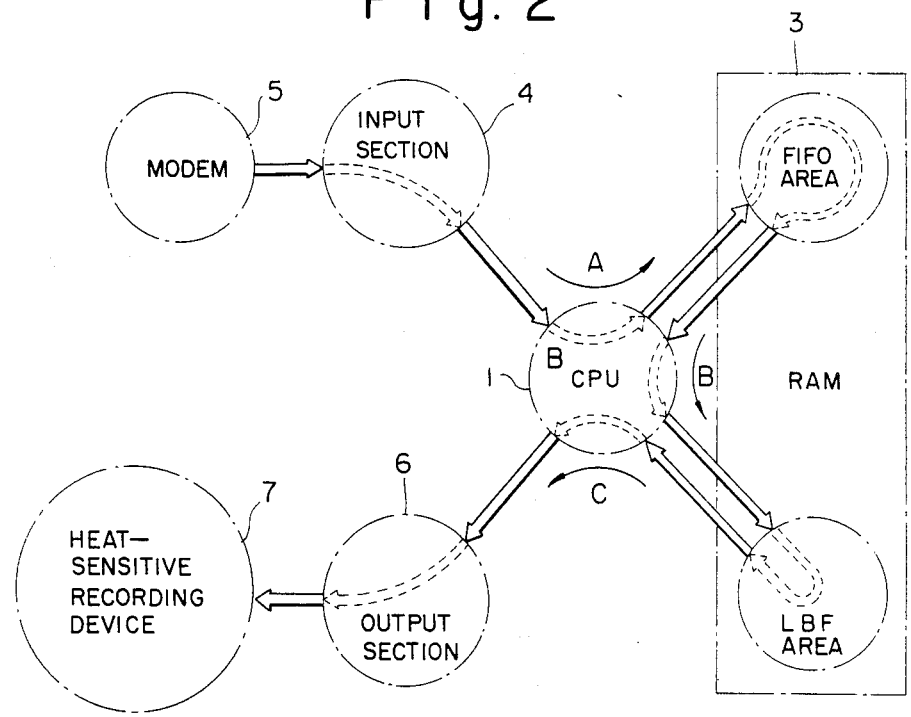
FIG. 2 is a schematic illustration showing the operation of the system shown in FIG. 1.

Referring now to FIG. 1, the present heat-sensitive recording system constitutes a part of a facsimile communication network and it comprises a central processing unit (CPU) 1, read only memory (ROM) 2, random access memory (RAM) 3, input section 4, MODEM 5, output section 6 and heat-sensitive recording device 7. CPU 1 is comprised of an 8-bit microprocessor. ROM 2 stores a program which is necessary to carry out the sequence of operation in accordance with the present invention; whereas, RAM 3 is a memory which stores data temporarily. As best shown in FIG. 2, RAM 3 includes a first-in-first-out (FIFO) area which receives and stores 8-bit data supplied from input section 4 and supplies as its output in the order in which they are stored, and a line buffer (LBF) area which stores two lines of decoded image information one after the other.

Input section 4 is an interface which converts serial data supplied from MODEM 5 into 8-bit parallel data, which is then supplied to a data bus 8. On the other hand, output section 6 is an interface which receives 8-bit parallel data from data bus 8 and supplies as its output the data of 256 bits at a time to heat-sensitive recording device 7, which includes a recording head provided with 2,048 electrically resistive elements arranged in a single array. Those recording elements are activated every 256 bits thereby the recording elements produce heat when electrical image signals are supplied to form an image on the surface of a heat-sensitive recording medium which is in sliding contact with the recording head. Since 256 bits are activated at a time, such a partial recording must be repeated eight times in order to complete recording of a single scanning line.

The operation of the system shown in FIG. 1 is schematically illustrated in FIG. 2. As shown, CPU 1 has three major functions as indicated by A, B and C. In function A, 8-bit data stored in input section 4 is transferred to a desired address in the FIFO area of RAM 3. In function B, 8-bit data is supplied to CPU 1 where the data is decoded, and then the decoded data is stored in the LBF area in RAM 3. In function C, when the image information for one scanning line is stored in the LBF area of RAM 3, it is supplied 8 bits by 8 bits to output section 6 until the number of stored bits reaches 256. Among these three functions A, B and C, CPU 1 normally executes function B, but as soon as 8-bit data has been stored in input section 4, an interrupt signal is generated and CPU 1 starts to execute function A. A timer interrupt signal is periodically generated and CPU 1 executes function C in response thereto. The order of priority of these functions is A>B>C.

In operation, the image data received by MODEM 5 is supplied bit by bit to input section 4 where the serially received data is converted into 8-bit parallel data, which is then stored in the FIFO area of RAM 3. Then, the 8-bit data thus stored in the FIFO area is supplied to CPU 1 on the first-in-first-out basis and upon having been decoded at CPU 1 the decoded data is stored in a first area of the LBF area. At this time, if the other second area of the LBF area stores decoded image data for one scanning line, the image data is transferred 8 bits by 8 bits to output section 6. Then, as soon as the number of image data stored in output section 6 has reached 256, the data is transferred from output section 6 to recording device 7. In this manner, recording device 7 carries out recording of image data 256 bits a time and such partial recording of 256 bits is carried out eight times to complete recording for a full scanning line. Thereafter recording device 7 is prepared for recording of the next scanning line.

Under the circumstances, no particular problem arises as long as the operating speed of the transmitter now in communication is approximately equal to that of the receiver which includes the present recording system. On the other hand, if the operating speed of the transmitter is substantially slower, it takes time to store image data for the next scanning line in the LBF area of RAM 3. As a result, at the time of carrying out recording for the next scanning line, the temperature of the recording head has dropped to a low level. When recording is carried out under such condition for a full page of paper, the overall density of a recorded image becomes relatively low.

In view of the above fact, in accordance with one embodiment of the present invention, the operating speed of the transmitter now in communication is examined prior to the step of recording so as to prevent the occurrence of decrease in image density due to cooling of the thermal head as described above. Preferably, the operating speed of the transmitter is examined at the time of protocol prior to the transmission of facsimile data. In accordance with one embodiment of the present invention, the same image data is used twice—double recording—to record the two adjacent scanning lines if the operating speed of the transmitter is below a predetermined value.

Figure 3A:
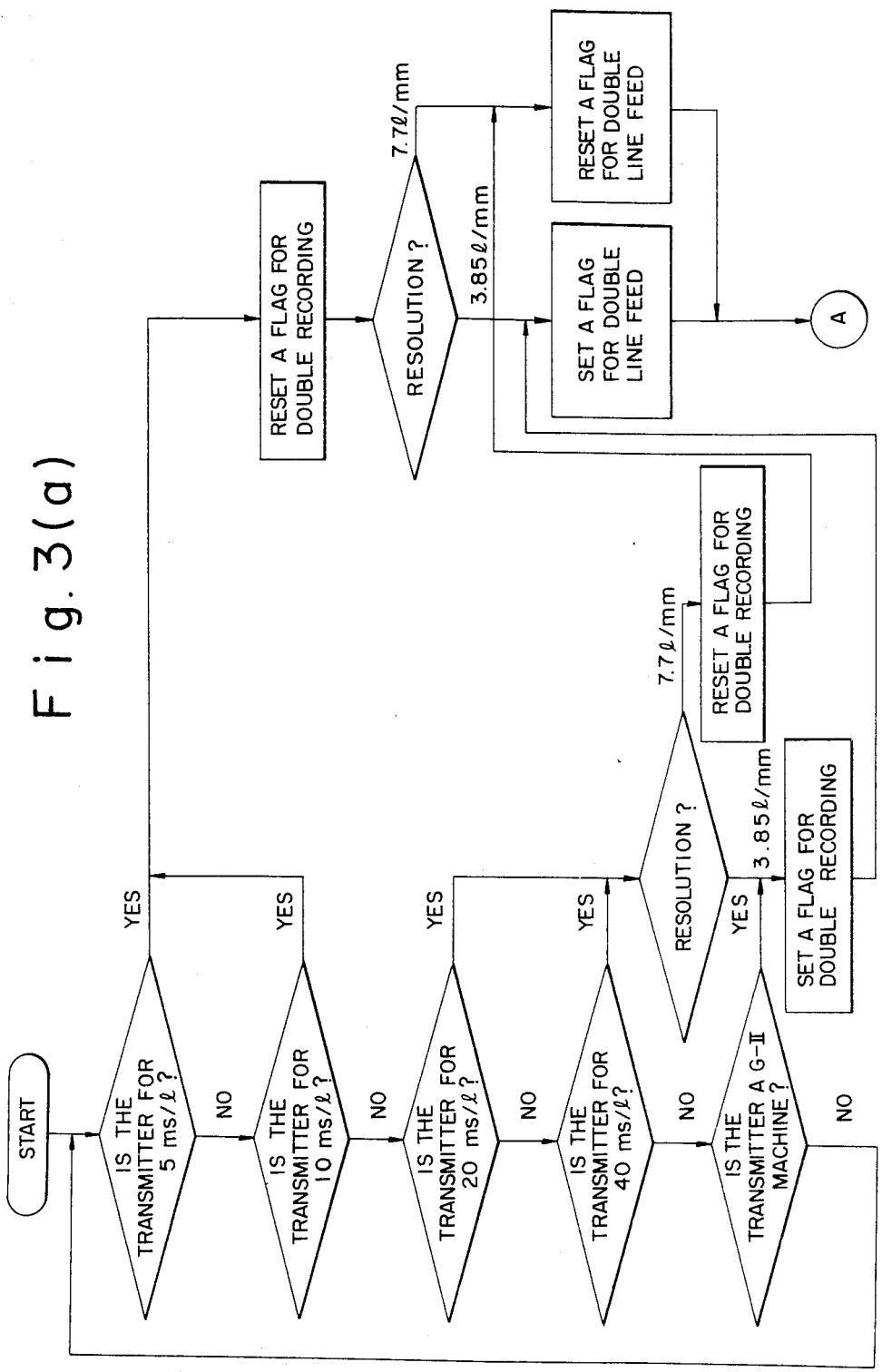
FIGS. 3(a) and 3(b) are flow charts showing the sequence of operation in accordance with one embodiment of the present invention.

Described more in detail with reference to FIG. 3(a), assuming that the receiver which includes the present recording system has the operating speed of 5 ms./line, CPU 1 of the present system examines the operating speed, i.e., 5 ms./line, 10 ms./line, 20 ms./line, 40 ms./line, or G-II, of the transmitter now in communication prior to recording operation. If the transmitter is found to possess the operating speed of 5 ms./line or 10 ms./line, a flag for double recording is reset (cleared) because the wait time for initiation of the next following line is short. On the other hand, if the operating speed of the transmitter is found to be 20 ms./line or 40 ms./line, a flag for double recording is either set or reset depending upon the resolution under the condition.

For example, in the case of 7.7 lines/mm of scanning density, the temperature of the recording head is maintained substantially high so that a flag for double recording is reset; however, when the scanning density is 3.85 lines/mm, the temperature of the recording head drops significantly by the time of recording of the next scanning line so that a flag for double recording is set in this event. In the case where the transmitter is a G-II machine, a flag for double recording is set unconditionally because the wait time or the time for recording a full scanning line requires 166.6 ms./line.

Then, depending upon the currently existing resolution, a flag for double line feed is set if the scanning line density is 3.85 lines/mm in order to arrange the scanning line density in the auxiliary scanning direction to be comparable to that in the main scanning direction, which is perpendicular to the auxiliary scanning direction. On the other hand, a flag for double line feed is reset if the scanning line density is 7.7 lines/mm.

Figure 3B:
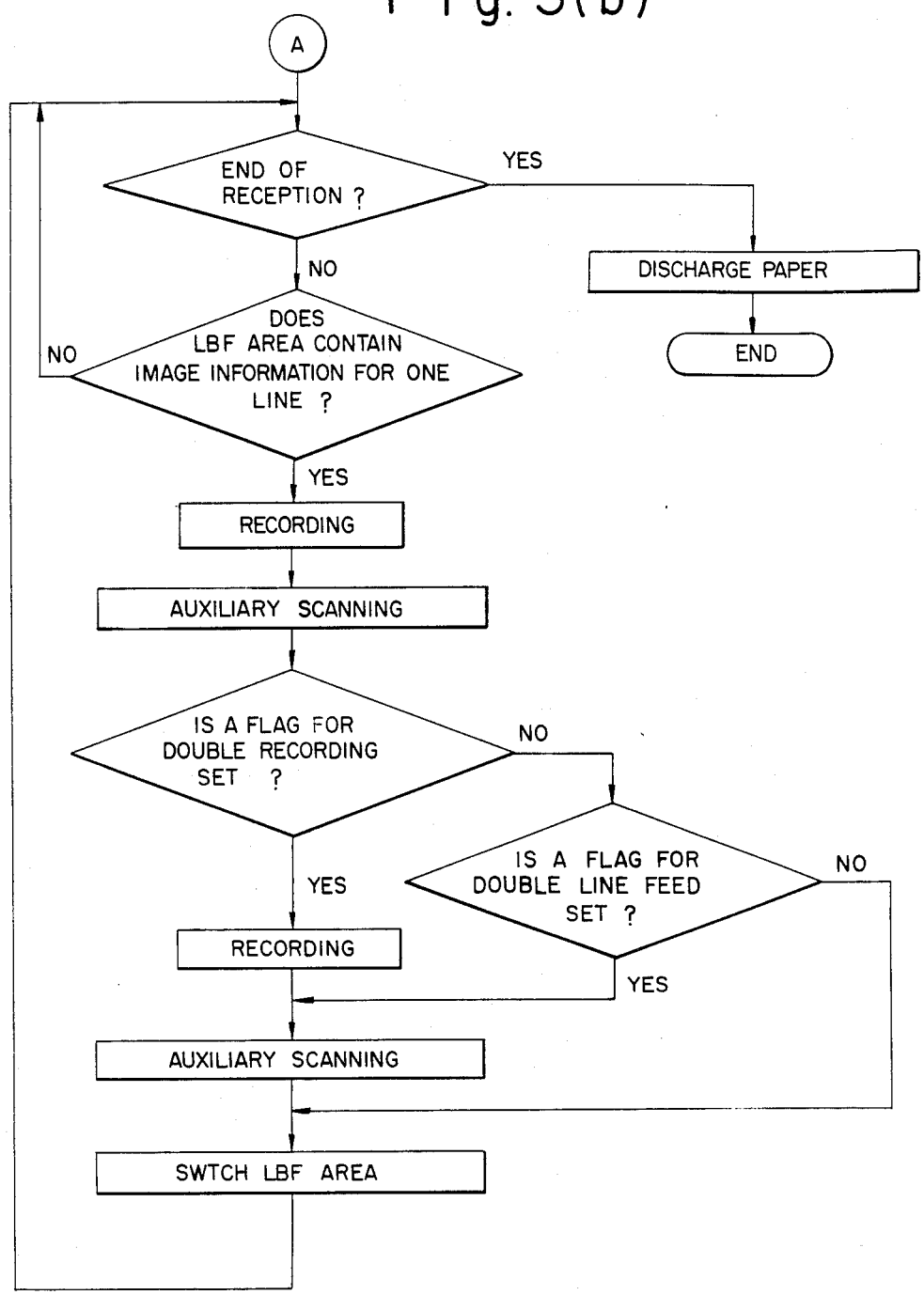

Prior to implementation of image data recording, CPU 1 carries out the preliminary operation as described above and the present system enters into the recording mode as shown in FIG. 3(b). As shown, upon completion of reception of full page information, a sheet of recording paper is discharged and the overall operation comes to an end. However, prior to the completion of data reception, it is examined whether the LBF area stores decoded image information sufficient for recording a full scanning line. If such information is found to exist, the information is transferred parts by parts from the LBF area to output section 6 and then to recording device 7 for implementation of heat-sensitive recording.

Upon completion of recording the image information for a full scanning line in the manner described above, an auxiliary scanning motor is driven to carry out a single line feed in the auxiliary scanning direction and thereafter it is examined whether a flag for double recording is set or not. If such a flag is set, since it indicates that the operating speed of the transmitter is slower, the same image data which has just been used is supplied again to recording device 7 for recording it in the adjacent scanning line. Then, after carrying out a single line feed in the auxiliary scanning direction, the LBF areas are switched and recording of the next scanning line is carried out in the same manner.

On the other hand, if a flag for double recording is reset, an examination is carried out as to whether a flag for double line feed is set or not. If the latter flag is found to be set, since it indicates that the current resolution is 3.85 lines/mm, a single line feed is carried out in the auxiliary scanning direction, followed by switching of LBF areas and recording of the next following scanning line. However, in the case where a flag for double line feed is reset, LBF areas are switched without extra line feed in the auxiliary scanning direction.

As described above, in accordance with one embodiment of the present invention, the same image information is used twice to keep the temperature of the thermal head at constant in the case where the transmitter now in communication is a G-II machine or in the case where the operating speed of the transmitter is either 20 ms./lines or 40 ms./lines and the scanning line density is 3.85 lines/mm. Therefore, it is possible to obtain recorded images of virtually the same density irrespective of the operating speed of the transmitter.

It is also to be noted that in facsimile communication the data transmission rate may vary from line to line depending upon the data compression ratio and therefore the recording period may differ from line to line. This may bring about variation in image density when recorded on a heat-sensitive recording medium.

In order to cope with this problem, the present invention also provides a heat-sensitive recording system which allows to obtain a recorded image of uniform image density independently of the data compression ratio. That is, in accordance with this aspect of the present invention, upon completion of recording image information for a single scanning line, if image information for the next scanning line is not ready, the previous image information is once again used for recording.

As described above, recording device 7 carries out recording for a block of 256 bits at a time and it is repeated eight times to cover the total length of a single scanning line, and thereafter it prepares for recording of the next following line. Under the circumstances, it may be that image information for the next scanning line is not yet ready in the LBF area depending upon the compression ratio of the image data which is now being received. As a result, the temperature of the recording head may drop, resulting in lowering of the image density of the next line. In order to cope with this problem, the present invention proposes to use the same image data which has been used for recording in the last preceding line in the case where image data for the next line is not ready in the LBF area.

Figure 4:
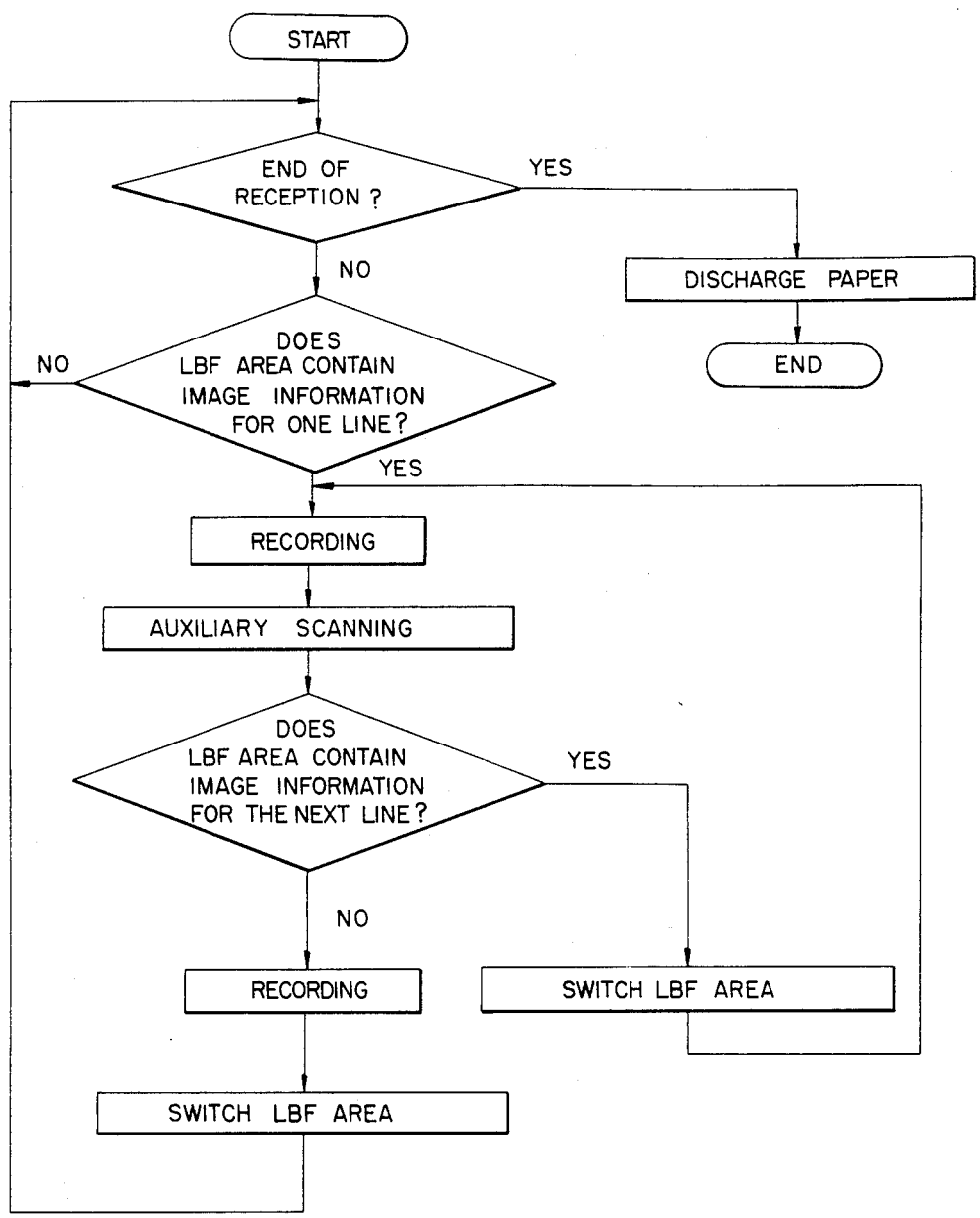
FIG. 4 is a flow chart showing the sequence of operation in accordance with another embodiment of the present invention.

Described in detail in this respect with reference to FIG. 4, if the reception for a full page is completed, a recording medium is discharged and the overall operation comes to an end. However, if the reception is not completed, CPU1 examines as to whether one of the LBF areas stores image information ready for use in recording a full scanning line. If the result is affirmative, then recording is carried out for the entire line, followed by the step of auxiliary scanning or advancement of the recording medium with respect to the recording head in the direction perpendicular to the main scanning direction. Thereafter, an examination is carried out to determine as to whether the other of the LBF areas stores image information for a full scanning length. If such information is ready, the LBF areas are switched and the image information stored in the other LBF area is read out to be finally supplied to recording device 7 where recording of the image information thus supplied is carried out in a similar manner.

On the other hand, if such information is not ready, the image information for a full scanning line is again read out of the LBF area from which the same image information has been read out in the last preceding step and the same image information is once again presented for use in recording. Thereafter switching of the LBF areas is carried out, followed by the step of recording the next scanning line.

By carrying out recording of image information in the above-described manner, the recording head of recording device 7 may be maintained at a constant temperature at all times and thus uniform image density may be ensured at all times irrespective of the data compression ratio of the image data which is being received. Consequently, the present invention allows to obtain a recorded image which is faithful to an original without differences in density from line to line.

While the above provides a full and complete disclosure of the preferred embodiments of the present invention, various modificaitons, alternate constructions and equivalents may be employed without departing from the true spirit and scope of the invention. Therefore, the above description and illustration should not be construed as limiting the scope of the invention, which is defined by the appended claims.

What is claimed is:

1. In a method of recording decoded image information on the surface of a heat-sensitive recording medium by first decoding and storing image information for one scanning line in one of a pair of storing means and then transferring said decoded image information stored in said one of said pair of storing means to a thermal recording head in sliding contact with said recording medium if all of said decoded image information for one scanning line has been stored in said one of said pair of storing means, the improvements reside in that upon completion of recording said decoded image information for one scanning line in said one of said pair of storing means, the same decoded image information which has been used in the last preceding step and which is stored in said one of pair of storing means is once again used for recording in the next adjacent scanning line if the next decoded image information for a full scanning line has not yet been decoded and stored in the other of said pair of storing means thereby allowing to maintain the temperature of said recording head substantially at constant.

* * * * *